(12) United States Patent
Karube

(10) Patent No.: US 6,204,991 B1
(45) Date of Patent: Mar. 20, 2001

(54) HEAD POSITION SIGNAL DEMODULATOR AND HEAD POSITIONING UNIT USING THE DEMODULATOR

(75) Inventor: Hiro Karube, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/102,639

(22) Filed: Jun. 23, 1998

(30) Foreign Application Priority Data

Jun. 26, 1997 (JP) .................................................. 9-170767

(51) Int. Cl.⁷ .................................................. G11B 5/596
(52) U.S. Cl. .......................... 360/78.04; 360/76; 360/29; 360/77.08
(58) Field of Search .................. 360/77.08, 48, 360/51, 29, 32, 39, 78.04, 78.05, 46, 78.07, 77.04, 76, 77.01; 329/304

(56) References Cited

U.S. PATENT DOCUMENTS

| 5,457,587 | * | 10/1995 | Suzuki | 360/77.01 X |
| 5,523,900 | * | 6/1996 | Kosugi et al. | 360/77.05 |
| 5,659,437 | * | 8/1997 | Tsunekawa et al. | 360/77.08 |
| 5,978,168 | * | 11/1999 | Mathews et al. | 360/77.08 X |
| 5,986,847 | * | 11/1999 | Le et al. | 360/77.08 X |

FOREIGN PATENT DOCUMENTS

| 60-10472 | 1/1985 | (JP) . |
| 6-243574 | 9/1994 | (JP) . |
| 7-287949 | 10/1995 | (JP) . |
| 7-334948 | 12/1995 | (JP) . |
| 8-221918 | 8/1996 | (JP) . |

* cited by examiner

Primary Examiner—Andrew L. Sniezek
Assistant Examiner—K. Wong
(74) Attorney, Agent, or Firm—Young & Thompson

(57) ABSTRACT

A head position signal demodulator that demodulates a position signal indicating the position of the magnetic head in the disk radius direction based on a servo pattern recorded on the magnetic disk includes a waveform shaping circuit which shapes an input signal obtained from the magnetic head according to the servo pattern and a phase comparison circuit which compares a phase of an output signal of the waveform shaping circuit and a phase of a reference signal and outputs a phase difference signal. The head position signal demodulator also includes a position signal generation circuit that generates a position signal of the magnetic head based on the phase difference signal, and a phase shifter which changes the phase of the reference signal during micro jogging, for an amount of the phase which has been set according to the amount of the micro jogging.

8 Claims, 9 Drawing Sheets

FIG. 6
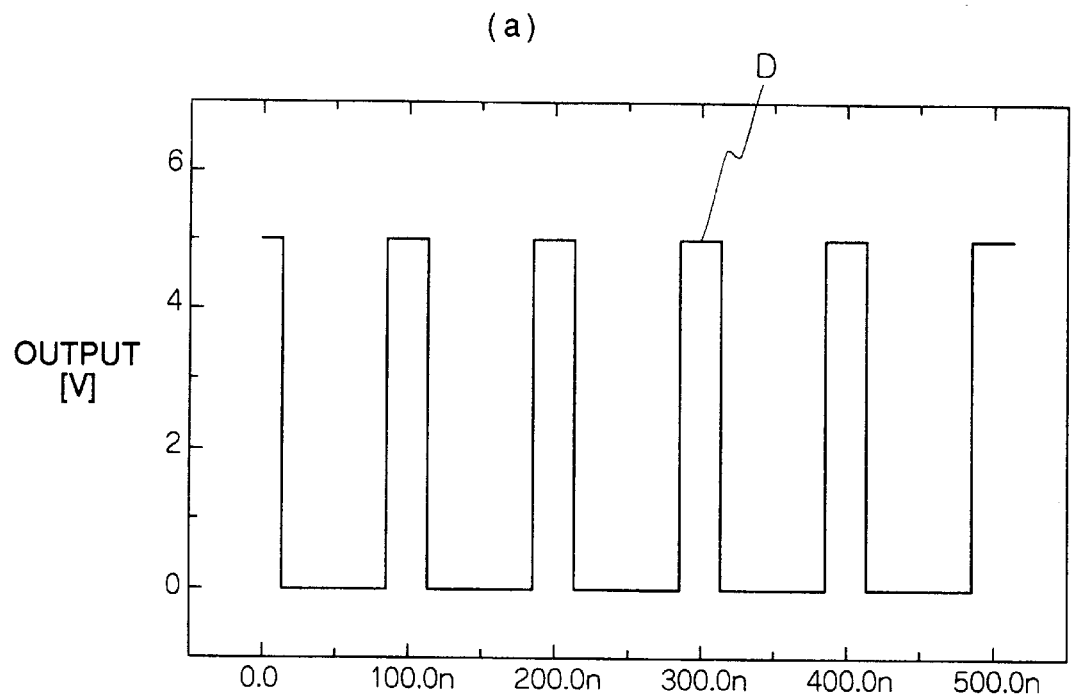
(a)
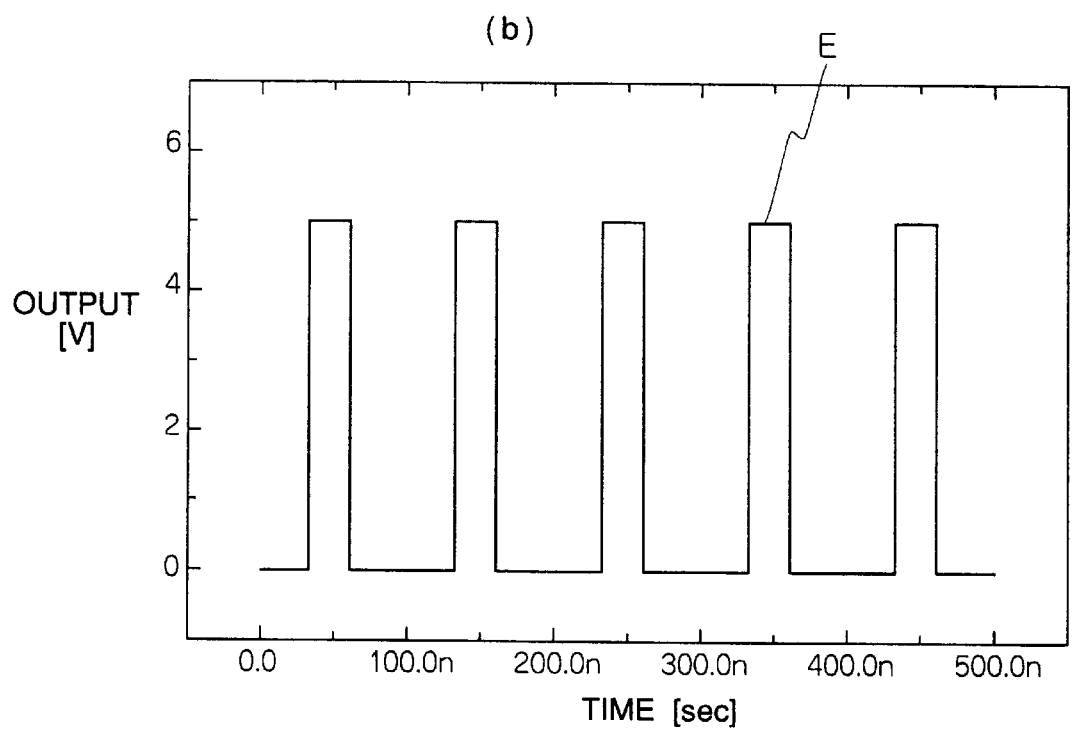
(b)

FIG. 7
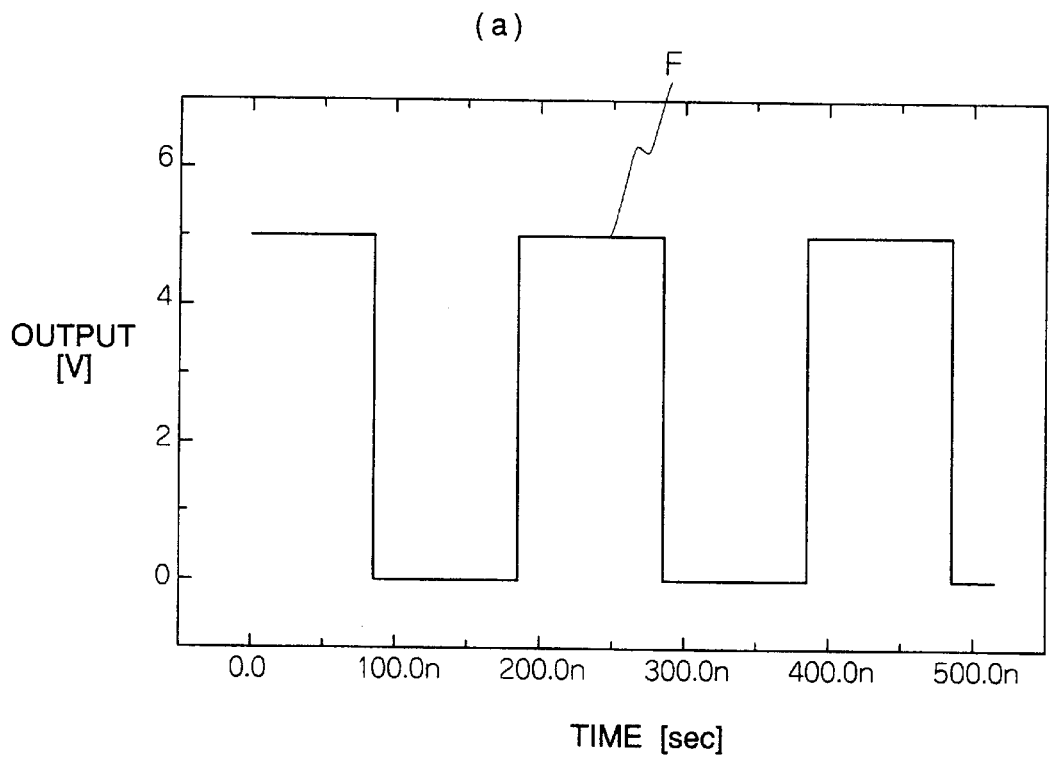
(a)
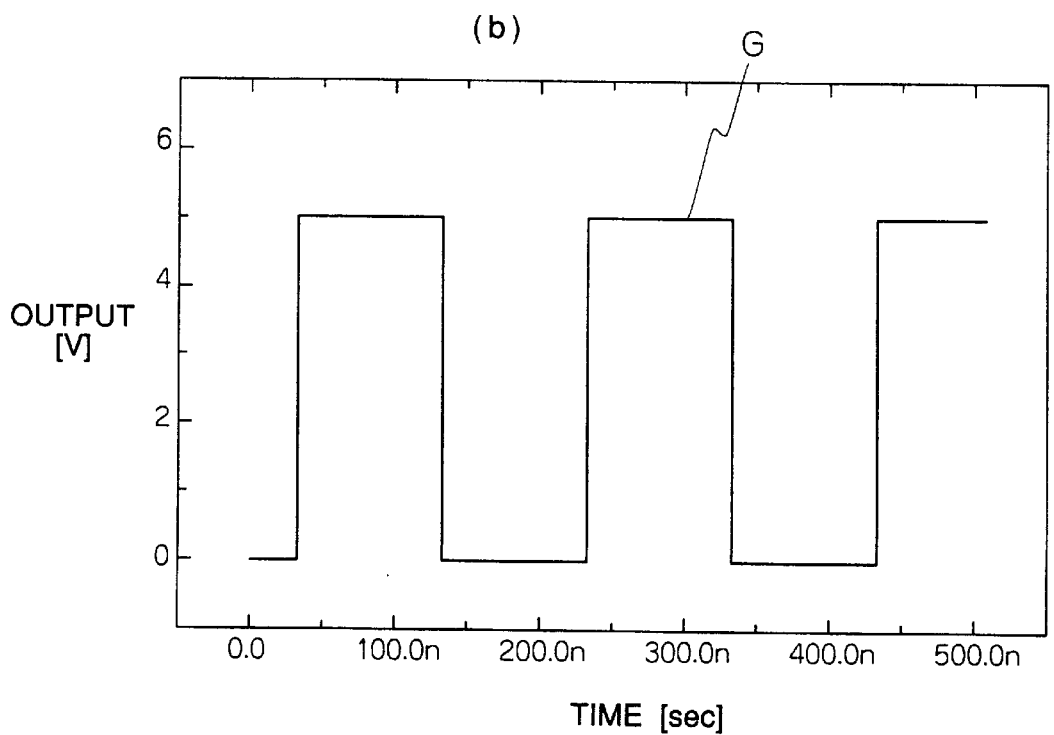
(b)

HEAD POSITION SIGNAL DEMODULATOR AND HEAD POSITIONING UNIT USING THE DEMODULATOR

BACKGROUND OF THE INVENTION

1. Field of the Invention

The present invention relates to a head position signal demodulator and a head positioning unit utilizing the demodulator, and more particularly to a head position signal modulator which generates a position signal of the head from a servo pattern and outputs the signal, and a head positioning unit utilizing the demodulator, in a magnetic disk unit which positions a magneto-resistance effect head by a rotary actuator.

2. Description of the Related Art

There is a type of a magnetic head where a record head and playback head are equipped at a specified interval along the tangential direction of a disk. For the playback head, a magneto-resistance effect head (MR head) is frequently used, and for the record head, an inductive head (ID head) is used. A magnetic disk unit has a type which positions a magnetic head in such a configuration by a rotary actuator. In this case, an inclination in the disk tangential direction occurs to the magnetic head depending on the position of the magnetic head on the disk. Because of this, a locus of the record head during recording and a locus of the playback head during playback may not match even if the magnetic head is scanning the same track. This is not good for regenerating data. Ideally the locus of the record head during recording and the locus of the playback head during playback should match.

Micro jogging is used for this control. Micro jogging is an operation for delicately adjusting the position of the magnetic head for recording and for playback, so that the locus of the record head during recording and the locus of the playback head during playback match on the same track. The magnetic head is positioned by regenerating a servo pattern which has been recorded on the magnetic disk, and controlling the actuator so that a position signal of the magnetic head which is generated according to the playback signal is maintained at a constant level. If micro jogging is performed here, the position where the magnetic head is supposed to be positioned differs for recording and for playback. Therefore in prior art, a value of the position signal to be maintained is different for recording and for playback.

This means that in a positioning control system, a control target value must be switched for recording and for playback, which made the configuration of the control system complicated. Also the relationship between the correction amount by micro jogging and the change of the position signal had to be measured for presetting the control target, which increased the number of manufacturing processes. An MR head also has such problems as thermal aspirity (TA), Barkhausen noise (BHN), baseline shift (BLS), asymmetric waveform (WA), output value fluctuation (PCOV), and asymmetric off track profile, and these problems sometimes interfere with the correct playback of servo patterns.

SUMMARY OF THE INVENTION

Accordingly, an object of the present invention is to fix the value of the position signal even after micro jogging, so that the positioning control system can control positioning with the same control target value all the time.

Another object is to simplify the configuration of the positioning control system by fixing the value.

Another object is to generate a correction position signal even if a servo pattern could not be regenerated correctly due to a problem of the MR head.

As a consequence, in accordance with the present invention, a head position signal demodulator that demodulates a position signal indicating the position of the magnetic head in the disk radius direction based on a servo pattern recorded on the magnetic disk, comprises: a waveform shaping circuit which shapes an input signal obtained from the magnetic head according to the servo pattern; a phase comparison circuit which compares a phase of an output signal of the waveform shaping circuit and a phase of a reference signal. and outputs a phase difference signal. The head position signal demodulator also includes a position signal generation circuit that generates a position signal of the magnetic head based on the phase difference signal, and a phase shifter which changes the phase of the reference signal during micro jogging, for an amount of the phase which has been set according to the amount of the micro jogging.

Here the waveform shaping circuit may include a band pass filter.

The waveform shaping circuit may include a positive side shaping circuit which extracts and shapes the positive side waveform of an input signal obtained from the magnetic head according to the servo pattern, and a negative side shaping circuit which extracts and shapes the negative side waveform of the input signal obtained from the magnetic head according to the servo pattern. In this case, the phase comparison circuit comprises a positive side comparison circuit which compares the phase of an output signal of the positive side shaping circuit with the phase of a positive side reference signal and outputs a phase difference signal, and a negative side comparison circuit which compares the phase of an output signal of the negative side shaping circuit with the phase of a negative side reference signal and outputs a phase difference signal. The position signal generation circuit includes a synthesizer which synthesizes an output signal of the positive side comparison circuit and an output signal of the negative side comparison circuit. The waveform shaping circuit may include a pulsing circuit which converts an input signal obtained from the magnetic head into pulses, and a ½ dividing circuit which converts an output signal of the pulsing circuit to a pulse signal with ½ frequency and 50% duty.

The phase comparison circuit may include a reference oscillator which outputs the positive side reference signal, and a 90° phase shifter which changes a phase of an output signal of the reference oscillator 90° to be the negative side reference signal.

The positive side shaping circuit may include a positive side detection circuit which extracts the positive side waveform of an input signal obtained from the magnetic head, and a positive side pulsing circuit which converts an output signal of the positive side detection circuit into pulses.

A positive side ½ dividing circuit which converts an output signal from the positive side pulsing circuit to a pulse signal with ½ frequency and 50% duty and outputs the pulse signal may also be included. The negative side shaping circuit, on the other hand, may include a negative detection circuit which extracts the negative waveform of an input signal obtained from the magnetic head, and a negative side pulsing circuit which converts an output signal of the negative side detection circuit into pulses. A negative side ½ dividing circuit which converts an output signal from the negative side pulsing circuit to a pulse signal with ½ frequency and 50% duty and outputs the pulse signal may also be included.

The servo pattern may include the first field and third field which has recorded phase patterns where a phase shifts with the π/4 deviation in the disk tangent direction each time ¼ of one track pitch shifts in the disk radius direction, and the second field which has recorded phase patterns where a phase shifts with the π/4 deviation in the opposite direction from the first and third fields each time ¼ of one track pitch shifts in the disk radius direction. The waveform shaping circuit may include a positive side shaping circuit which extracts the positive side waveform of an input signal obtained from the magnetic head according to the servo pattern and shapes the positive side waveform, and a negative side shaping circuit which extracts the negative side waveform of the input signal obtained from the magnetic head according to the servo pattern and shapes the negative side waveform. In this case, the phase comparison circuit comprises a positive side comparison circuit which compares the phase of an output signal of the positive side shaping circuit with the phase of the positive side reference signal and outputs a phase difference signal, and a negative comparison circuit which compares the phase of an output signal of the negative side shaping circuit with the phase of the negative side reference signal and outputs a phase difference signal. The phase comparison circuit also includes a reference oscillator that outputs the positive side reference signal and a switch which selects output of the phase shifter as the positive side reference signal during playback of the first field and third field, and selects output of the reference oscillator as the positive side reference signal during playback of the second field. The position signal generation circuit comprises the first sample and hold circuit which holds the phase difference signal output from the positive side comparison circuit independently for the first field, the second field and the third field, and the second sample and hold circuit which holds the phase difference signal output from the negative side comparison circuit independently for the first field, the second field and the third field. The position signal generation circuit also includes the first synthesizer which synthesizes the positive side phase difference signal of the second field and the negative side phase difference signal of the second field, and the second synthesizer which synthesizes the positive side phase difference signals of the first and the third fields and the negative side phase difference signals of the first and the third fields all together. A subtracter which outputs a difference signal between an output signal of the first synthesizer and an output signal of the second synthesizer as a position signal is also included.

Another invention is a head positioning unit which positions a magnetic head by a rotary actuator, and comprises a head position signal demodulator which has one of the above configuration types, and a rotary actuator control circuit which outputs a manipulated variable for converging the magnetic head to the target position, to the rotary actuator based on the position signal of the magnetic head which is output by the head position signal demodulator.

In the case of a servo pattern where a phase of the pattern changes according to the position in the disk radius direction (phase pattern), the position signal on the ordinary track and the position signal on the micro jogging position can be the same value by shifting the phase of the reference signal for a specified amount during execution of micro jogging. Therefore, use of this position signal can make the configuration of the actuator control system simpler. For the MR/IR head, for example, it is possible to easily calculate the micro jogging amount from the distance between the MR head and the ID head, and the skew angle by the rotary actuator, and to easily determine the amount of the phase change amount of the servo pattern corresponding to the micro jogging amount. This makes it easy to calculate the phase change amount to be set to the phase shifter, and the manufacturing process can be simplified since precise measurement is not required in the manufacturing process.

If the band pass filter is equipped to the waveform shaping circuit, then waveform splitting at the external circumference of the disk caused by the influence of the resolution of the MR head can be prevented using the function of a low pass filter. An increase in rise time and fall time by the influence of TA can also be prevented using the function of a high pass filter. Since the band pass filter can have both of these functions, it is economical. Using a filter is also effective to improve the S/N of a signal since frequency components other than those in the filter pass band can be compressed.

If an input signal from the magnetic head is separated into the positive side waveform and the negative side waveform for processing, and those waveforms are later synthesized to be a position signal, then optimum pulsing for each head becomes possible even for heads having a different waveform symmetry WA, and information from the servo pattern can be read even if a problem related to the MR head operation occurs during demodulation of a phase detection type servo pattern.

If an input signal from the magnetic head is divided, where frequency becomes ½, then the frequency of the reference signal used for phase comparison can also be ½. In other words, recording frequency for writing a phase pattern can be set to a double value, and the length of the phase pattern can be ½ to obtain the same cycle of the signal, which improves format efficiency.

If the negative reference signal is generated by a 90-shifting phase of the output of the reference oscillator, then one reference oscillator is sufficient, which is economical.

BRIEF DESCRIPTION OF DRAWINGS

FIGS. 6(A–B) is a graphical representation of waveforms of the signals D and E in FIG. 1, where 6(*a*) is the signal D and 6(*b*) is the signal E;

FIGS. 7(A–B) is a graphical representation of waveforms of the signals F and G in FIG. 1, where 7(*a*) is the signal F and 7(*b*) is the signal G;

DESCRIPTION OF THE PREFERRED EMBODIMENTS

Figure 1:
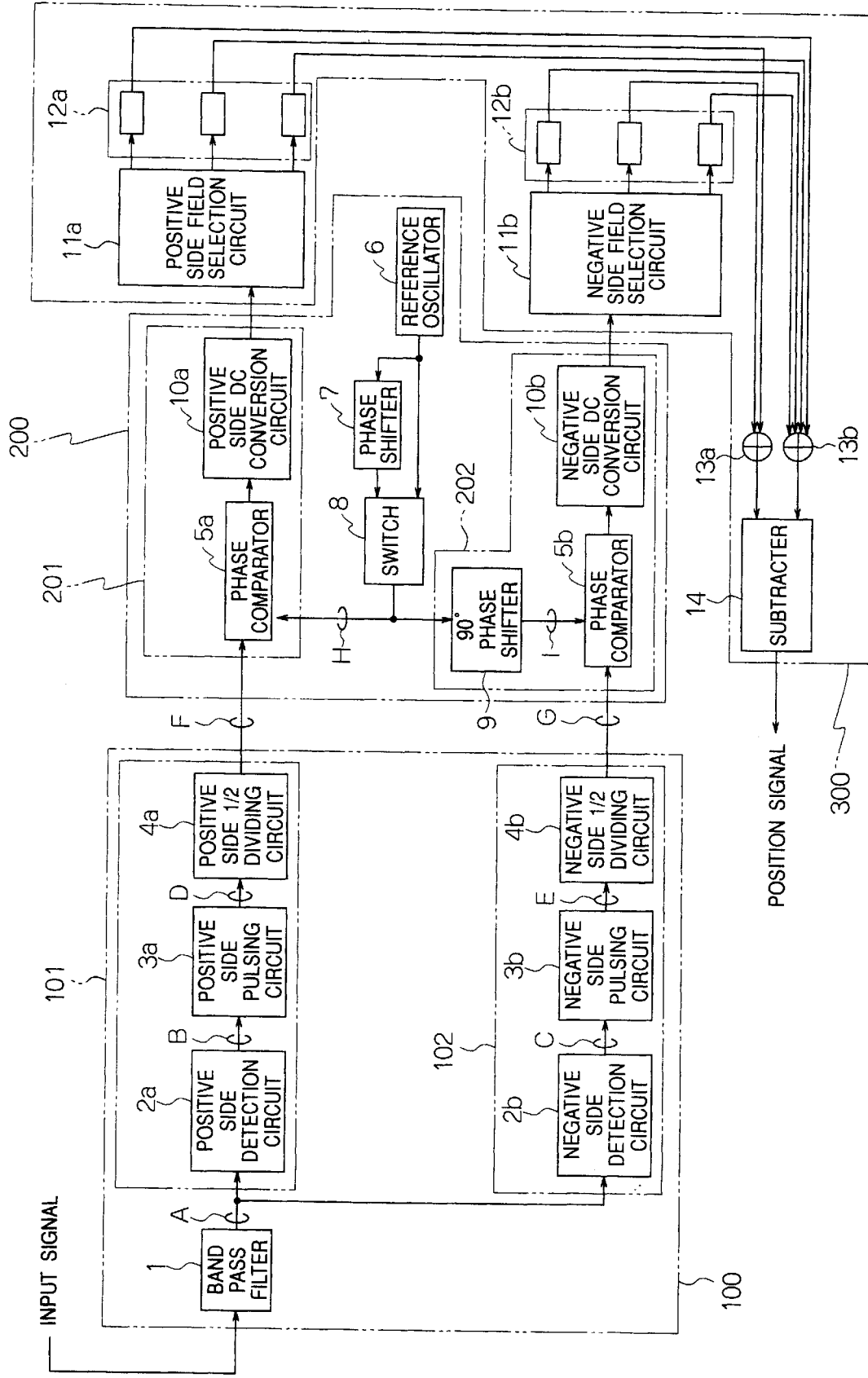
FIG. 1 is a block diagram depicting the head position signal demodulator in accordance with an embodiment of the present invention.

Referring to the drawings, embodiments of the present invention are now described.

FIG. 1 shows a head position signal demodulator which demodulates a position signal indicating the position of a magnetic head in the disk radius direction based on a servo pattern recorded on the magnetic disk. The demodulator includes a waveform shaping circuit 100 which shapes an input signal obtained from the magnetic head according to the servo pattern, and a phase comparison circuit 200 which compares a phase of an output signal of the waveform shaping circuit 100 and a phase of a reference signal and outputs a phase difference signal. The demodulator also includes a position signal generation circuit 300 which generates a position signal of the magnetic head based on the phase difference signal. Here, the phase comparison circuit 200 has a phase shifter 7 which changes the phase of the reference signal for the amount of phase which has been set according to the amount of the micro jogging, during execution of micro jogging.

In this embodiment, the waveform shaping circuit 100 also includes a band pass filter 1.

The waveform shaping circuit 100 also includes a positive side shaping circuit 101 which extracts and shapes the positive side waveform of the input signal obtained from the magnetic head according to the servo pattern, and a negative side shaping circuit 102 which extracts and shapes the negative side waveform of the input signal obtained from the magnetic head according to the servo pattern. Corresponding to these circuits, the phase comparison circuit 200 includes a positive side comparison circuit 201 which compares the phase of an output signal of the positive side shaping circuit 101 with the phase of a positive side reference signal H and outputs a phase difference signal, and a negative side comparison circuit 202 which compares the phase of an output signal of the negative side shaping circuit 102 with the phase of a negative side reference signal I, and outputs a phase difference signal. The position signal generation circuit 300 includes synthesizers 13a and 13b which synthesize an output signal of the positive side comparison circuit 201 and an output signal of the negative side comparison circuit 202.

Figure 4:
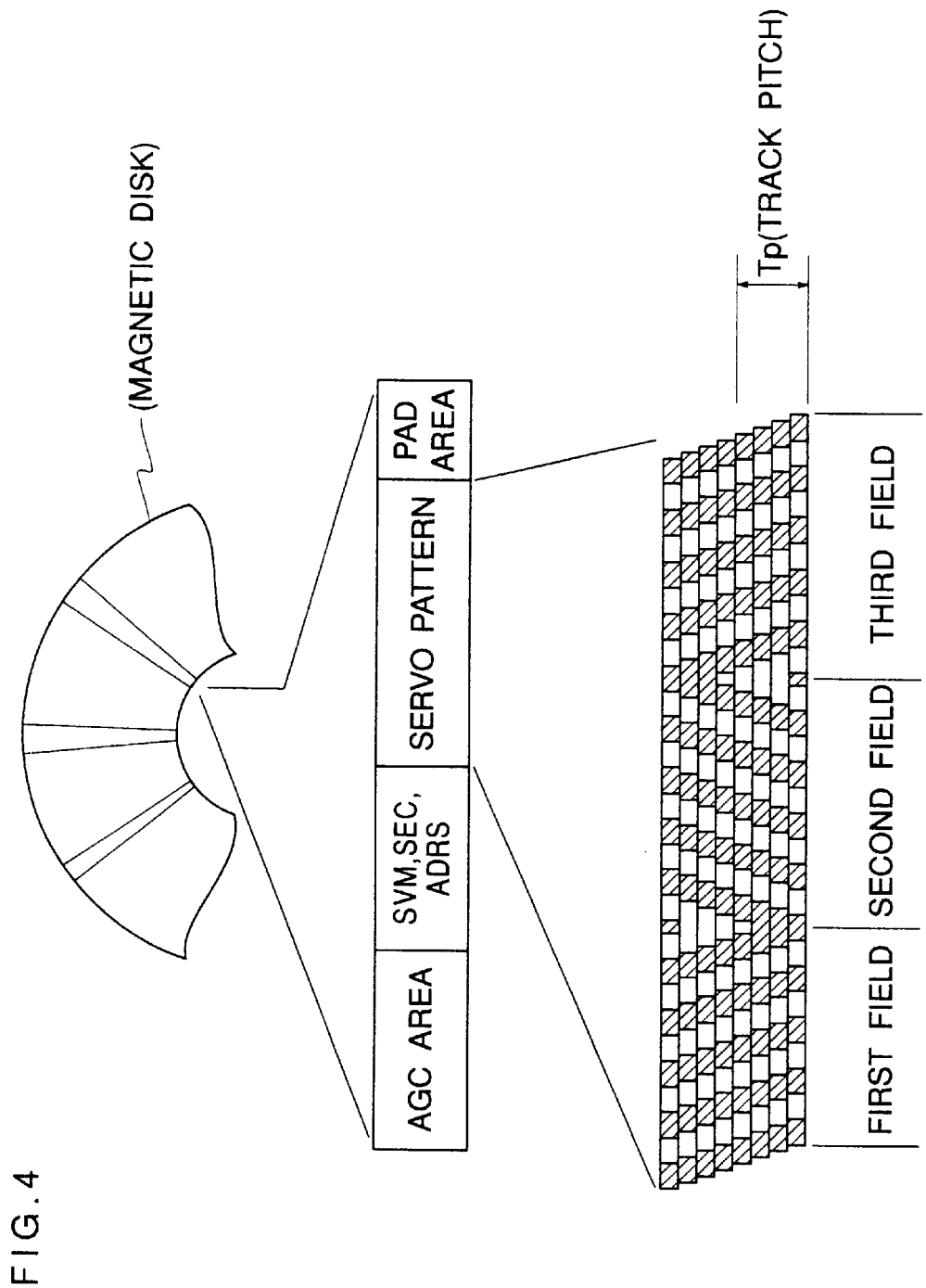
FIG. 4 is a block diagram depicting an arrangement of the phase pattern used for the embodiment in FIG. 1 on the magnetic disk.

FIG. 4 shows a servo pattern to be information for positioning of the head. This servo pattern is divided into the first field, the second field, and the third field in the disk tangent direction (tangential direction). Each field is recorded at a single frequency, and the first field and the third field have been magnetized such that a phase is shifted with a π/4 deviation each time ¼ of one track pitch shifts in the disk radius direction. The second field has been magnetized such that a phase is shifted with π/4 deviation in the opposite direction from the first and third directions in the disk radius direction, each time ¼ of one track pitch shifts. This type of servo pattern is referred to as a phase pattern. In this embodiment, this phase pattern is generated by the MR head.

The configuration in FIG. 1 is described next, where the band pass filter 1 limits the frequency bands of an input signal. Detection circuits 2a and 2b, which function as separation circuits, separate the output waveform of the band pass filter 1 to the positive side and the negative side. Pulsing circuits 3a and 3b convert the output of the detection circuits 2a and 2b into pulses. Here, each pulsing circuit 3a and 3b converts the positive waveform and the negative waveform into pulses in TTL level respectively. ½ division circuits 4a and 4b convert the output of the pulsing circuits 3a and 3b to signals with ½ frequency and 50% duty.

A reference oscillator 6 outputs a signal with frequency which is ½ of the recording frequency of the servo pattern. A phase shifter 7 shifts the phase of an output signal of the reference oscillator 6 according to the amount of micro jogging which has been set in advance. Here, the head positioning mechanism of the present invention includes the micro jogging operation function of the head. A switch 8 inputs the output of the reference oscillator 6 to phase comparators 5a and 5b during regeneration of the first and the third fields, and outputs the output of the phase shifter 7 to phase comparators 5a and 5b during playback of the second field. Conventionally the switch 8 judges whether the field being regenerated is the first, the second or the third field by the attribute of a general clock. The phase shifter 9 shifts the phase of an output signal from the switch 8 by π/2, and inputs the signal to the phase comparator 5b at the negative side.

The phase comparator 5a at the positive side outputs a signal indicating the phase difference between an output signal of the ½ division circuit 4a and an output signal of the phase shifter 8. The phase comparator 5b at the negative side outputs a signal indicating the phase difference between an output signal of the ½ division circuit 4b and an output signal of the phase shifter 9. DC conversion circuits 10a and 10b output DC signals having voltage values according to the phase difference indicated by the output signals of the phase comparators 5a and 5b. Each one of the sample and hold circuits 12a and 12b includes the three sample and hold circuits (hereafter S/H circuit) respectively, and holds the voltage values output from the DC conversion circuits 10a and 10b for the first, the second and the third field independently. Field selection circuits 11a and 11b judge a field being regenerated, and distribute the output voltage values of the DC conversion circuits 10a and 10b to the three S/H circuits. Conventionally the field selection circuits 11a and 11b judge whether the field being regenerated is the first, the second or the third field by the attribute of a general clock.

The first synthesizer 13a adds the output of the S/H circuit corresponding to the second field at the positive side and the output of the S/H circuit corresponding to the second field at the negative side. The second synthesizer 13b adds the output of the S/H circuits corresponding to the first and the third fields at the positive side and the output of the S/H circuits corresponding to the first and the third fields at the negative side. Subtracter 14 outputs a signal indicating the difference between the output of the first synthesizer 13a and the output of the second synthesizer 13b. This signal becomes a head position signal.

The principle of the present invention is described next. A regenerated signal passes through the band pass filter 1. Since phase patterns have been recorded at the same frequency, regardless the position in the disk radius direction, recording linear density is higher in the inner side of the disk than in the outer side of the disk. Therefore at the external circumference side of the disk, a signal from the phase pattern may not be a sine wave but the waveform may split depending on the resolution of the MR head. To shape such a waveform, a high frequency component is removed using a low pass filter. In a waveform with a TA problem, several μseconds of a large increase of baseline occurs during rise time and fall time. Generally, this frequency is lower than the frequency of a signal from the phase pattern. To control this increase, a low frequency component is removed using the bypass filter. Therefore it is economical to use a band pass filter which plays both roles of a low pass filter and a high pass filter. Passing a signal through a filter also improves the S/N of the signal by controlling the frequency component of bands other than those of the pass bands of the filter.

The signal that passes through the band pass filter 1 is separated into the positive side waveform and the negative side waveform by the positive side detection circuit 2a and the negative side detection circuit 2b respectively. The separated signals are sent to the pulsing circuits 3a and 3b respectively. Pulsing is executed after separating the signal into the positive side waveform and the negative side waveform because optimum pulsing for each head is possible even for heads with a different waveform symmetry WA.

Signals output from the pulsing circuits 3a and 3b enter the ½ dividing circuit where the frequency of signals become ½. The purpose of the ½ dividing circuit is to make the duty of a pulse 50%. Since the frequency becomes ½ the frequency of the reference signal for phase comparison can also be ½. In other words, the recording frequency for writing a phase pattern can be set to a double value, and the length of the phase pattern can be ½ to obtain the same cycle of the signal, which improves format efficiency. The signal from the reference oscillator 6 is input to two phase comparators 5a and 5b, but to the negative side phase comparator 5b the signal is input after the phase of the signal is shifted 90° by the phase shifter 9. This is because the deviation of the phases of the positive side pulse waveform and the negative side pulse waveform is 90°. When micro jogging is executed, the signal from the reference oscillator 6 is input to the phase comparators 5a and 5b after passing through the phase shifter 7 because the Phase of the signal from the reference oscillator 6 is shifted for the amount of phase corresponding to the amount of micro jogging. The amount of micro jogging at this time can be determined only from the distance that can be geometrically given by the deviation between the magnetic center of the MR device and the magnetic center of the ID device and the skew angle.

In the conventional method, a value of a position signal in the disk radius direction is measured, and using this result, the head is positioned to the target position. According to the present embodiment, merely predetermining the amount of micro jogging is sufficient, which allows omitting the process for measuring the value of the position signal in the disk radius direction, which decreases cost. The signals output from the phase comparators 5a and 5b are input from the DC conversion circuits 10a and 10b, which convert the signals to DC components corresponding to the respective phase difference. These values of DC output are held by the S/H circuits, which are in the next step, respectively.

Outputs of the positive side and the negative side S/H circuits for the first field and the third field are added. Outputs of the positive side and the negative side S/H circuits for the second field are also added. These added outputs of the S/H circuits become values corresponding to the phase differences between the signals from the first field, the second field and the third field, and the signal from the reference oscillator 6. Here, the time for processing the signal from the second field to determine the phase difference between the signal from the second field and the signal from the reference oscillator 6 is double the time for processing the signals from the first field and the third field. Therefore, the signal from the phase pattern can be demodu- lated as a position signal by subtracting the sum of the values related to the second field from the sum of the values related to the first field and the third field.

Figure 2:
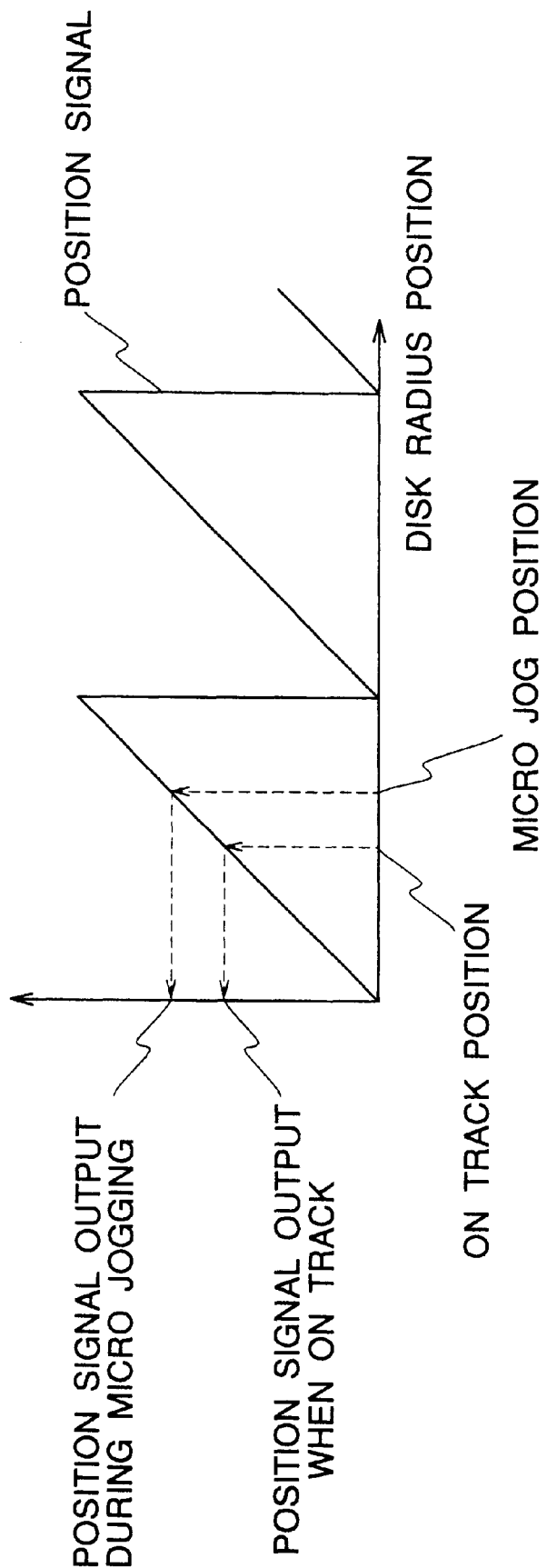
FIG. 2 is an explanatory drawing indicating the relationship of position signals during micro jogging and when on track in accordance with a prior art.

FIG. 2 shows a relationship of the position signals during micro jogging and when on track in accordance with a prior art.

Figure 3:
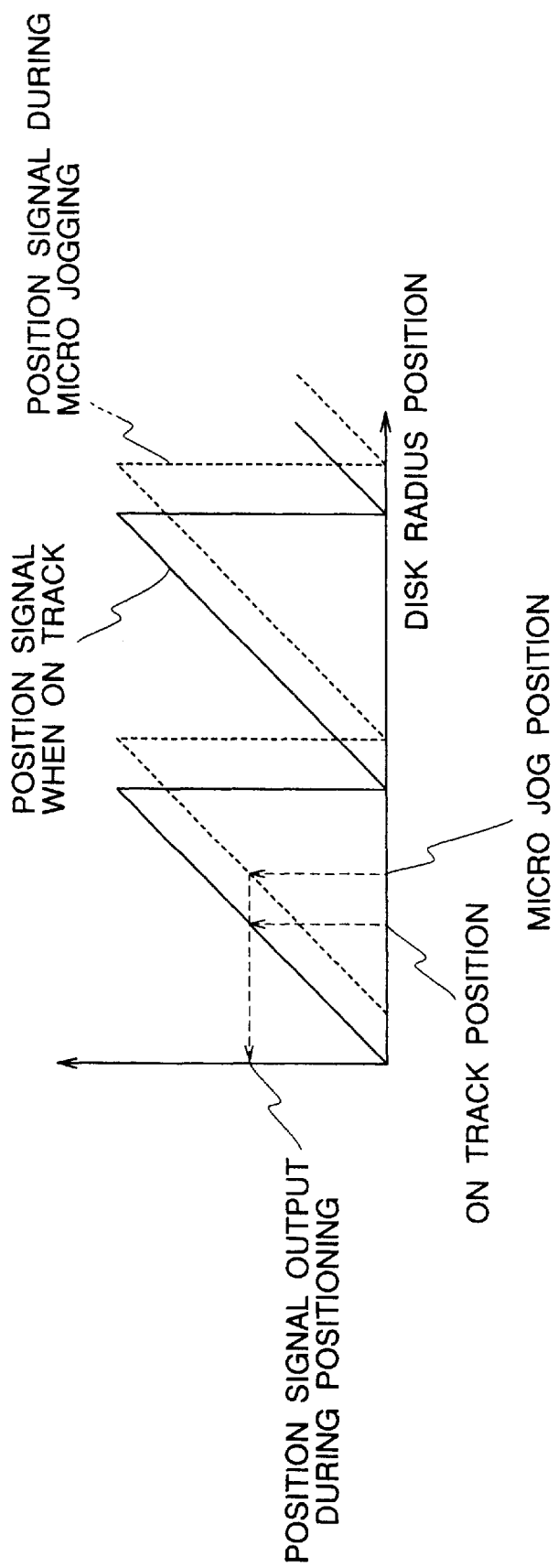
FIG. 3 is an explanatory drawing indicating the relationship of position signals during micro jogging and when on track in accordance with the embodiment in FIG. 1.

Since positions in the disk radius direction during micro jogging and when on track differ, the values of the position signal during micro jogging and when on track differ, and the head is positioned such that the position signal output values become different values respectively. In accordance with the present embodiment, on the other hand, when a phase difference between the signal related to the second field and the signal from the reference oscillator 6 is detected during micro jogging, the phase of the signal from the reference oscillator 6 is shifted for the amount of phase corresponding to the amount of micro jogging first, then the signal is input to the phase comparators 5a and 5b. This is the same as the result when only the phase pattern recorded in the second field is shifted to the disk radius direction. Therefore, as FIG. 3 shows, the phase difference of the first field and the third field from the second field indicates the shift of the entire phase pattern to the disk radius direction. In other words, the position signal output value is the same during micro jogging and when on track, and the head can be positioned at the value of only one position signal at any time of micro jogging.

In this embodiment, when a phase difference between the signal related to the second field and the signal from the reference oscillator 6 is detected, the phase of the signal from the reference oscillator 6 is shifted for the amount of phase corresponding to the amount of micro jogging. When a phase difference between the signal related to the first and third fields and the signal from the reference oscillator 6 is detected, on the other hand, the phase of the signal from the reference oscillator 6 may be shifted for the amount of phase corresponding to the amount of micro jogging. This method allows positioning the head at the value of only one position signal at any time of micro jogging.

Now the embodiment of the present invention is described in detail referring to the drawings.

FIG. 4 shows the arrangement of the phase pattern on the magnetic disk used for the present embodiment. The magnetic disk is divided into 64 sectors per circle, and there is a servo area at the beginning of each sector. The servo area is further divided into an AGC area, a servo mark (SVM), a sector number (SEC), an cylinder address (ADRS), a servo pattern and a PAD area. The servo pattern is divided into the first field, the second field and the third field. In the magnetization patterns of the first field and the third field, a phase shifts with π/4 deviation each time ¼ of the track pitch TP is shifted in the disk radius direction, and in the magnetization pattern of the second field, a phase shifts with π/4 deviation in the direction opposite from the first field and the third field each time ¼ of the track pitch TP is shifted in the disk radius direction. The phase pattern recording method is described next.

The magnetic disk used here has a CoCrPtTa alloy layer, which is the recording layer, on an aluminum substrate, and a protective layer and lubricant coated on the recording film. The recording head used here is an MR/ID composite head. The width of the MR device section in the track direction is 2.6 μm, and the width of the ID device section in the track direction is 3.8 μm. A servo track writer (STW) is connected to the MR/ID composite head for recording the above mentioned phase pattern. When a phase pattern is recorded, the feeding pitch of the head by STW in the disk radius direction is 1.04 μm. This is ¼ the track pitch, which is 4.16 μm, that is, the track density is 6100 TPI. The disk rotation speed is 7200 rpm, the recording frequency is 10 MHz, and the recording current is 33 mAOP. Phase patterns were recorded in all disk radius directions at the same frequency. Playback was performed by the MR head by a flowing sense current of 11.3 mA.

Figure 9:
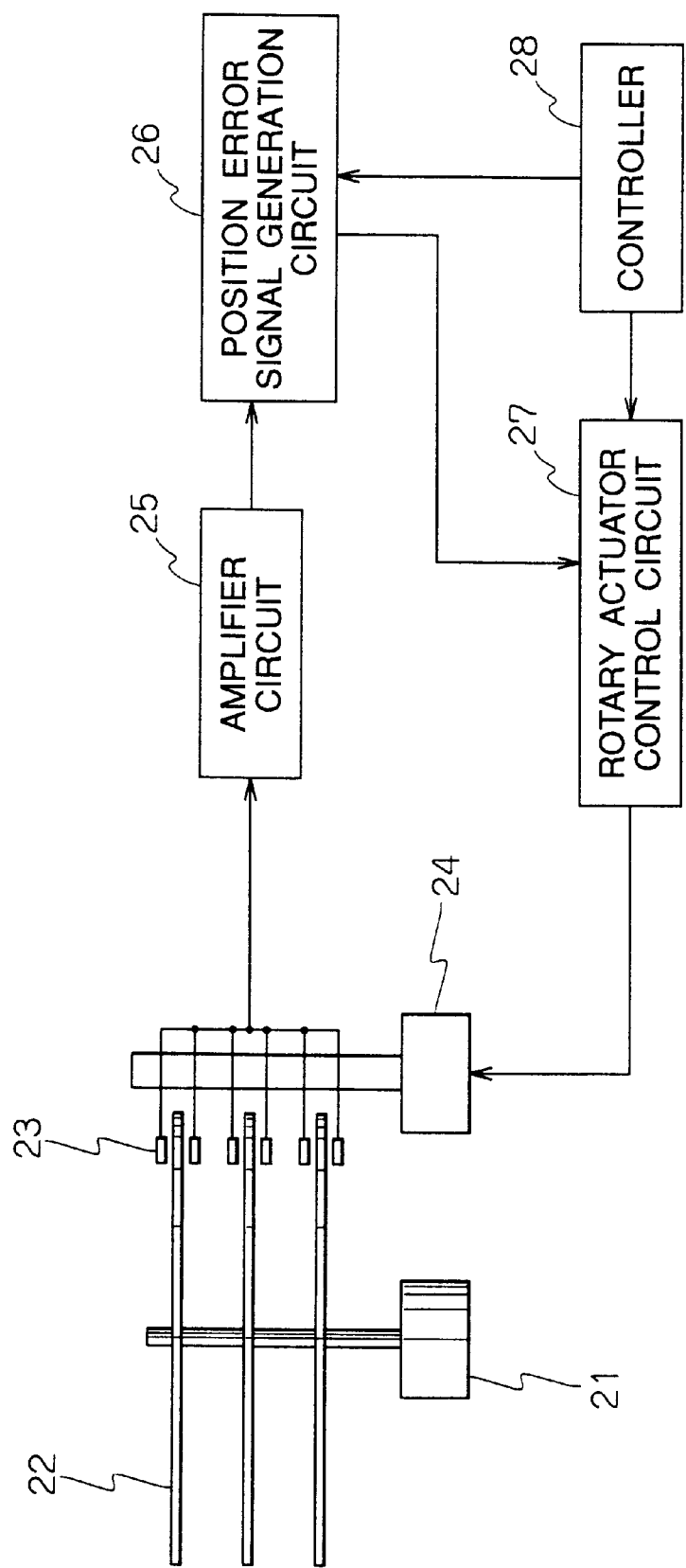
FIG. 9 is a block diagram depicting the configuration of the head positioning unit including the head position signal demodulator in FIG. 1.

FIG. 9 is a block diagram depicting the head positioning mechanism including the head position signal demodulator in accordance with the above embodiment.

In FIG. 9, the spindle motor 21 rotates the disk 22 at a constant angular speed. On the disk 22, a servo pattern with the above described phase pattern has been recorded. The MR/ID composite head 23 is moved by the rotary actuator 24 along the disk surface. The amplifier circuit 25 amplifies playback output of the MR head. Here, the playback output of the MR/ID composite head 23 is amplified by the amplifier circuit 25 up to the level which does not affect the operation of the position error signal generation circuit 26 (position signal demodulation circuit) in the next step. The position error signal generation circuit 26 includes the above mentioned head position signal demodulator, and calculates the head position error signal from the demodulated head position signal. The rotary actuator control circuit 27 outputs a manipulated variable in the direction, where the head position error signal will converge to zero to the rotary actuator 24 based on the generated head position error signal. The controller 28 controls the operation timing of the position error signal generation circuit 26 and the rotary actuator control circuit 27.

Figure 5:
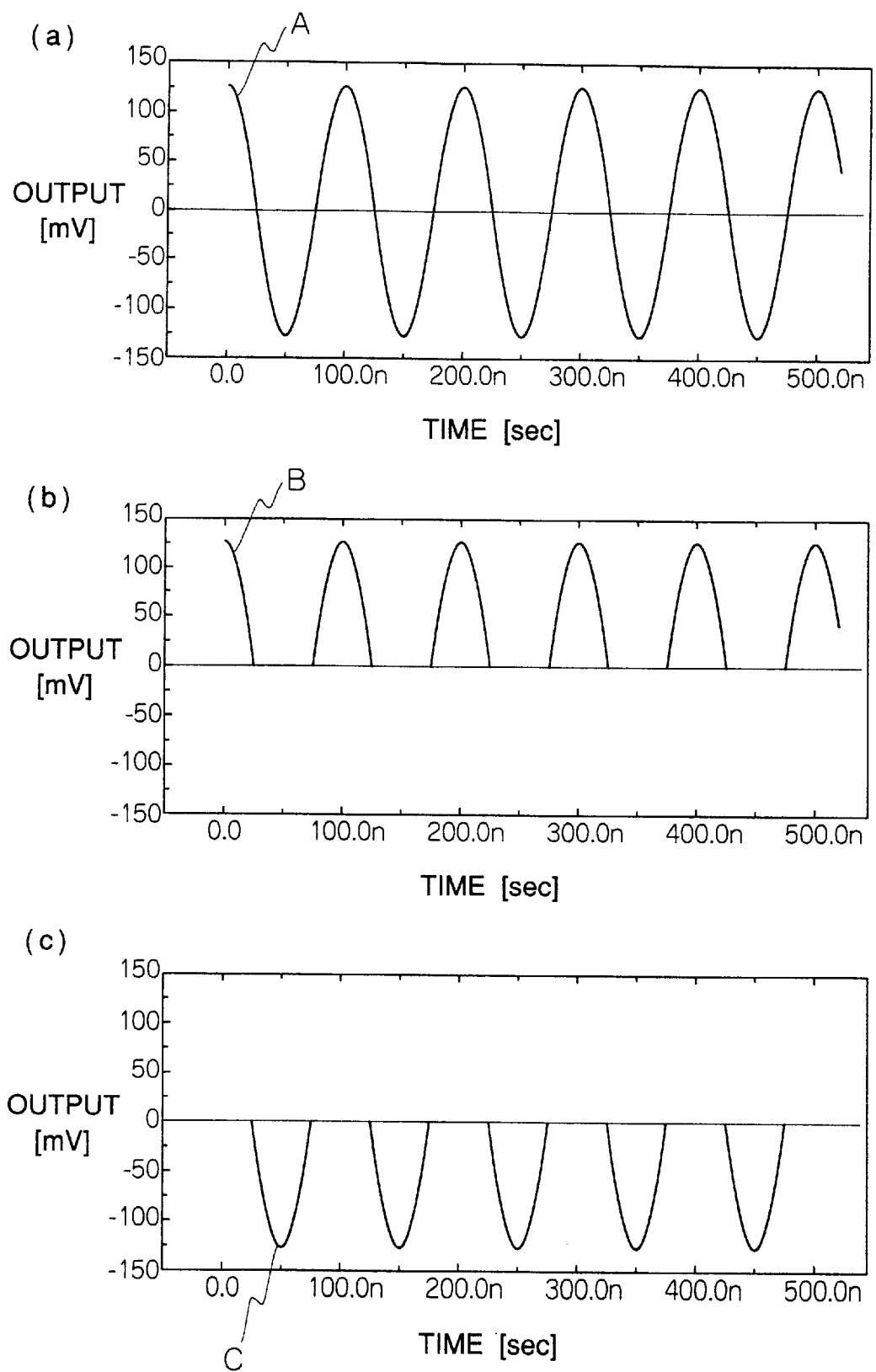
FIGS. 5(A–C) is a graphical representation of regenerated waveforms of the signals A, B and C in FIG. 1, where 5(*a*) is the signal A, 5(*b*) is the signal B, and 5(*c*) is the signal C.

FIG. 5(a) shows the playback waveform of the signal A in FIG. 1 in the internal circumference of the disk. Since this is after passing through the band pass filter 1, the waveform of the signal has good S/N, with the noise component removed. FIG. 5(b) and FIG. 5(c) show the waveforms of the signals B and C in FIG. 1. It is clearly seen that the waveforms have been detected and separated into the positive side waveform and the negative side waveform.

FIG. 6(a) and FIG. 6(b) show the waveforms of the signals D and E in FIG. 1. It is clearly seen that the positive side waveform and the negative side waveform have been converted to the pulse waveforms at the TTL level by the pulsing circuits 3a and 3b. The pulsing circuit used here is a comparator. By controlling the reference voltage of the comparator, accurate demodulation is possible even if WA, BHN, BLS or PCOV occur.

FIG. 7(a) and FIG. 7(b) show the waveforms of the signals F and G in FIG. 1. The waveforms have been converted to a 50% duty by the ½ dividing circuits 4a and 4b. D-FF (D flip-flop) has been used for the ½ dividing circuit. The reference oscillator 6 used here is a high stable temperature compensating crystal oscillator with an oscillation frequency of 5 MHz. For the phase comparators 5a and 5b, edge trigger type phase comparators have been used.

Figure 8:
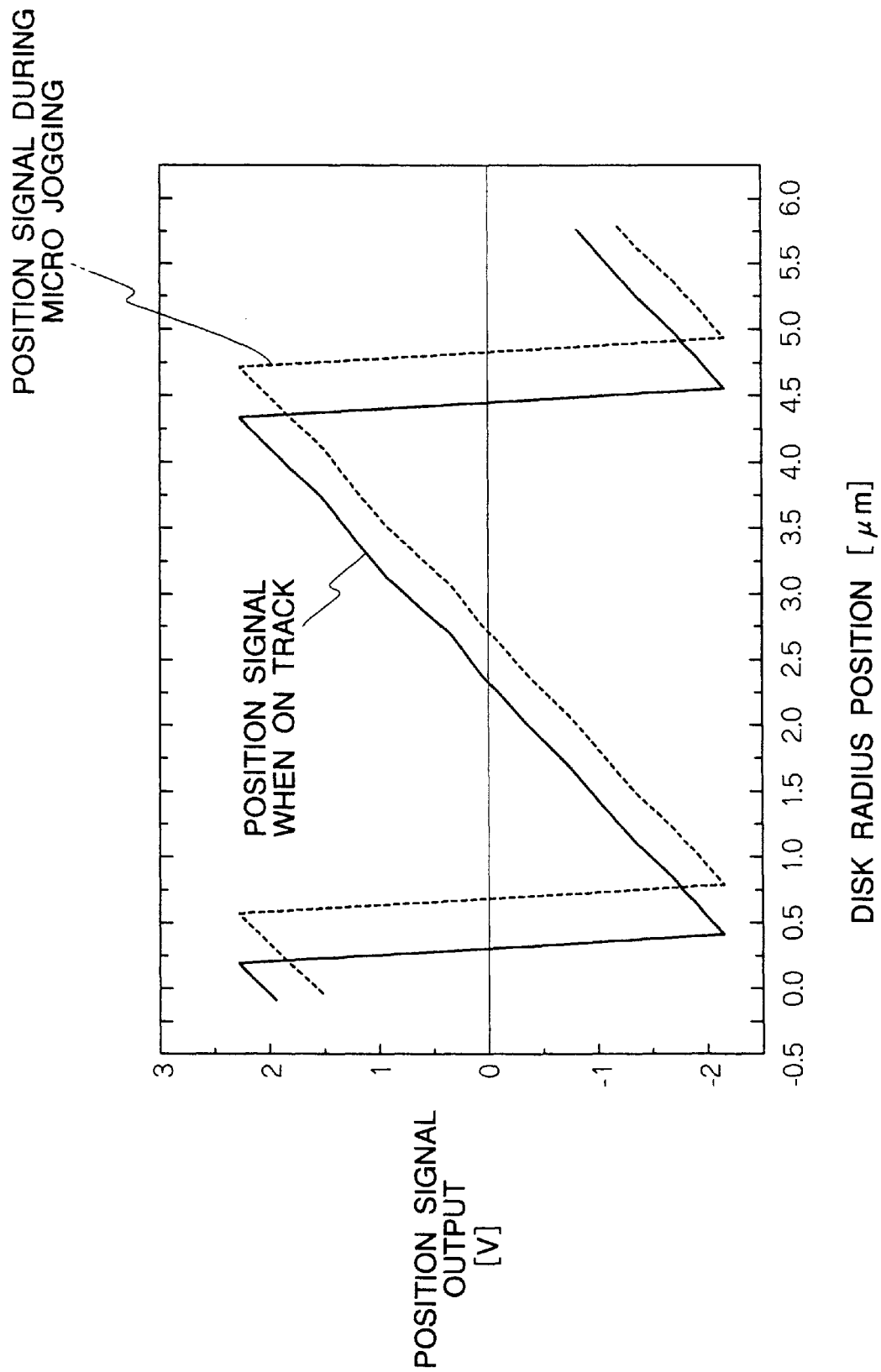
FIG. 8 is an explanatory drawing indicating the result after measuring the demodulated position signal.

After the phase differences from the signal of the reference oscillator 6 is determined by the phase comparators 5a and 5b, the signals are converted to DC by the DC conversion circuits 10a and 10b corresponding to the phase differences, and the signals from the first field, the second field and the third field are finally demodulated to the position signal by way of the S/H circuits 12a and 12b. The continuous line in FIG. 8 shows the result of measuring the position signal which was demodulated while moving the position of the head during playback at a 0.1 μm pitch only for one track. It shows that the position signal has been correctly demodulated. The position where the value of the position signal is zero is the position when on the track. Then 0.4 μm micro jogging was executed and the signal of the reference oscillator 6 was shifted by 17° by the phase shifter 7. And the position signal was observed while moving the head at a 0.1 μm pitch in the disk radius position. As a result, the change of the position signal for one track became like the dotted line in FIG. 8. In this case (the dotted line in FIG. 8), the zero positions are deviated for 0.4 μm from the position when on the track, and the position has been changed for the amount of phase of the reference signal 6 which was changed by the phase shifter 7. This means that the head can be positioned at the value of only one position signal at any time of micro jogging.

The present invention may be embodied without the band pass filter 1.

What is claimed is:

1. A head position signal demodulator for demodulating a position signal indicating a position of a magnetic head in a disk radius direction based on a servo pattern recorded on the magnetic disk, comprising:

a shaping circuit for shaping an input signal obtained from the magnetic head according to said servo pattern;

a phase comparison circuit for comparing a phase of an output signal of said shaping circuit and a phase of a reference signal, and for outputting a phase difference signal;

a position signal generation circuit for generating a position signal of the magnetic head based on said phase difference signal; and a phase shifter for changing the phase of said reference signal during micro jogging, for an amount of the phase which can be determined according to the amount of micro jogging.

2. The head position signal demodulator according to claim 1, further comprising a band pass filter.

3. The head position signal demodulator according to claim 1, further comprising a positive side shaping circuit for extracting the positive side waveform of the input signal obtained from the magnetic head according to said servo pattern, and for shaping the waveform, and a negative side shaping circuit for extracting the negative side waveform of the input signal obtained from the magnetic head according to said servo pattern, and for shaping the waveform, said phase comparison circuit comprising a positive side comparison circuit for comparing the phase of the output signal of said positive side shaping circuit and the phase of the positive side reference signal, and for outputting a phase difference signal, and a negative side comparison circuit for comparing the phase of the output signal of said negative side shaping circuit and the phase of the negative side reference signal, and for outputting a phase difference signal, and said position signal generation circuit comprising a synthesizer for synthesizing the output signal of said positive side comparison circuit and the output signal of said negative side comparison circuit.

4. The head position signal demodulator according to claim 1, comprising a pulsing circuit for converting an input signal obtained from the magnetic head to pulses, and a ½ dividing circuit for converting the output signal of the pulsing circuit to a pulse signal with ½ frequency and 50% duty.

5. The head position signal demodulator according to claim 3, further comprising a reference oscillator for outputting said positive side reference signal, and the 90° phase shifter for changing the phase of the output signal of said reference oscillator by 90° to generate said negative side reference signal.

6. The head position signal demodulator according to claim 3, further comprising a positive side detection circuit for extracting the positive side waveform of an input signal obtained from the magnetic head, a positive side pulsing circuit for converting the output signal of the positive side detection circuit to pulses, and a positive side ½ dividing circuit for converting the output signal of the positive side pulsing circuit to a pulse signal with ½ frequency and 50% duty, and for outputting the pulse signal, and said negative side shaping circuit comprising, a negative side detection circuit for extracting the negative side waveform of the input signal obtained from the magnetic head, a negative side pulsing circuit for converting the output signal of the negative side detection circuit to pulses, and a negative side ½ dividing circuit for converting the output signal of the negative side pulsing circuit to a pulse signal with ½ frequency and 50% duty and for outputting the pulse signal.

7. The head position signal demodulator according to claim 1, wherein the servo pattern comprises a first field and a third field where a phase pattern which phase shifts with $\pi/4$ deviation in a disk tangent direction each time ¼ of one track pitch shifts in disk radius direction has been recorded, and a second field where a phase pattern which phase shifts with $\pi/4$ deviation in direction opposite from said first and third fields each time ¼ of one track pitch shifts in disk radius direction, said shaping circuit comprising a positive side shaping circuit for extracting a positive waveform of the input signal obtained from the magnetic head according to said servo pattern and for shaping the waveform, and a negative side shaping circuit for extracting a negative waveform of the input signal obtained from the magnetic head according to said servo pattern and for shaping the waveform, said phase comparison circuit comprising a positive side comparison circuit for comparing the phase of the output signal of said positive side shaping circuit and the phase of the positive side reference signal, and for ouputting a phase difference signal, a negative side comparison circuit for comparing the phase of the output signal of said negative side shaping circuit and the phase of the negative side reference signal, and for outputting a phase difference signal, a reference oscillator for outputting the positive side reference signal, and a switch for selecting output of said phase shifter as the positive side reference signal during playback of said first field and third field, and for selecting output of said reference oscillator as the positive side reference signal during playback of said second field, and said position signal generation circuit comprising a first sample and hold circuit for holding the phase difference signal output from the positive side comparison circuit independently for the first field, the second field and the third field, the second sample and hold circuit for holding the phase difference signal output from the negative side comparison circuit independently for the first field, the second field, and the third field; a first synthesizer for synthesizing the positive side phase difference signal of the second field and the negative side phase difference signal of the second field, a second synthesizer for synthesizing the positive side phase difference signals of the first and the third fields and the negative side phase difference signals of the first and the third fields all together, and a subtracter for outputting the difference signal between the output signal of the first synthesizer and the output signal of the second synthesizer as a position signal.

8. A head positioning unit for positioning a magnetic head by a rotary actuator, comprising:

the head position signal demodulator according to claim 1; and a rotary actuator control circuit which outputs a manipulated variable for converging the magnetic head to a target position based on the position signal of said magnetic head which is output by said head position signal demodulator.

\* \* \* \* \*